United States Patent Office

3,505,392
Patented Apr. 7, 1970

3,505,392
CARBONYL BIS-URETHANE PRODUCTION
Vincent Kerrigan and Kenneth William Pearson, Manchester, England, assignors to Imperial Chemical Industries Limited, London, England, a corporation of Great Britain
No Drawing. Filed June 17, 1966, Ser. No. 558,264
Claims priority, application Great Britain, July 30, 1965, 32,706/65
Int. Cl. C07c 127/16
U.S. Cl. 260—479
3 Claims

ABSTRACT OF THE DISCLOSURE

A process for the manufacture of carbonyl bisurethanes which comprises reacting a N-unsubstituted carbamic ester with phosgene in the absence of acid-binding agents, and in a polar organic liquid inert to phosgene and containing at least one oxygen atom in the molecule as solvent.

---

This invention relates to a new chemical process and more particularly to a new and improved process for the manufacture of carbonyl bisurethanes.

It is well-known that carbonyl bisurethanes can be manufactured in general, by the interaction of a carbamic ester and phosgene. Since both the carbamic ester and the carbonyl bisurethane derived therefrom are, with rare exceptions, solids at ordinary temperatures it is convenient and efficient to carry out the reaction in a solvent and to recover the final product by the usual steps of evaporation and concentration. Hitherto, however, it has been considered necessary, when using a solvent, to carry out the reaction in the presence of acid-binding agents, or more especially pyridine, which has introduced expense either directly in the cost of material or indirectly in the form of additional complications in working-up procedures and recovery of solvents. It has now been found however that phosgenation of carbamic esters can be carried out expediently and in the absence of acid-binding agents by using as solvents polar organic liquids containing at least one oxygen atom in the molecule.

According to the invention there is provided a process for manufacture of carbonyl bisurethanes which comprises reacting a N-unsubstituted carbamic ester with phosgene in the absence of acid-binding agents, and in a polar organic liquid, containing at least one oxygen atom in the molecule, as solvent. It is preferred to use as solvent a carboxylic acid ester, an ether and/or a N,N-disubstituted carbamic ester which is inert to phosgene.

As examples of carbamic esters which may be used, there may be mentioned alkyl, aralkyl, cycloalkyl and aryl carbamates, such as n-propyl carbamate, isopropyl carbamate, ethyl carbamate, n-butyl carbamate, isobutyl carbamate, sec-butyl carbamate, amyl carbamates, hexyl carbamate, cyclohexyl carbamate, methyl cyclohexyl carbamate, phenyl carbamate, and o, m or p-methyl phenyl carbamate.

The solvents used in the new process should be inert to phosgene and for this purpose should be free from groups, such as hydroxyl, amino and monosubstituted amino, which are themselves reactive with phogene. As examples of solvents which can be used, there may be mentioned:

CARBOXYLIC ACID ESTERS

Suitable solvents include alkyl, cycloalkyl, aralkyl, alkenyl and substituted alkyl esters of aliphatic monocarboxylic acids such as methyl, ethyl, propyl, isopropyl, butyl, isobutyl, secbutyl, amyl, isoamyl, hexyl, heptyl, cyclopropyl, cyclohexyl, benzyl, phenylethyl, vinyl, allyl, isopropenyl, 2 - methoxyethyl, 2 - ethoxyethyl, 2 - butoxyethyl, 2 - ($\beta$ - methoxyethoxy)ethyl, 2-($\beta$ - ethoxyethoxy)ethyl and 2 - ($\beta$ - butoxyethoxy)ethyl esters of acetic, propionic, butyric, isobutyric, valeric, hexoic, pivalic, octoic methoxyacetic, ethoxyacetic and phenylacetic acids; lower alkyl, alkenyl and cycloalkyl esters of aromatic monocarboxylic acids such as methyl, ethyl, propyl, isopropyl, butyl, isobutyl, amyl, allyl and cyclohexyl esters of benzoic, o-, m- or p-toluic and o-methoxybenzoic acids, lower alkyl esters of aliphatic and aromatic dicarboxylic acids such as methyl, ethyl, propyl, isopropyl, butyl, isobutyl and amyl esters of succinic, glutaric, adipic, pimelic, suberic, azelaic, maleic and phthalic acids; alkyl esters of carbonic acid such as dimethyl, diethyl, diisopropyl, dipropyl and dibutyl carbonates; and monocarboxylic esters of polyhydroxy compounds such as the acetates, propionates, butyrates, hexoates, cyclohexoates, cyclopentoates, benzoates, and o, m or p-methylbenzoates of ethylene glycol, propylene glycol, diethylene glycol, triethylene glycol, dipropylene glycol, 2:2-diethyl propan-1:3-diol, 2-methyl-2-propylpropan - 1:3-diol, 2-ethyl-2-butylpropan-1:3-diol, neopentyl glycol, 1:5-pentanediol, 2-methyl-pentan-1:3-diol, 2:2-dimethylbutan - 1:3 - diol, 2:2:4 - trimethylpentan - 1:3 - diol, 2 - ethylhexan - 1:3 - diol, hexylene glycol and 1:2:6-hexantriol.

ETHERS

Suitable solvents include bisalkyl, cycloalkyl, aralkyl, alkenyl and aryl ethers such as diethyl, diphenyl, dipropyl, diisopropyl, dibutyl, dihexyl, dicyclohexyl, ethyl-n-propyl, methylisopropyl, ethyl-n-butyl, methylphenyl, ethylphenyl ethers; 1:1:3-triethoxyhexane, ethylene diethyl ether, ethylene di-n-butylether; diethyl, dimethyl, di-n-butyl ethers of diethylene glycol and triethylene glycol, etc., and cyclic ethers such as tetrahydrofuran, 1:4-dioxan, 1:3-dioxan, 2-methyl-2-ethyl-1:3-dioxan.

CARBAMIC ESTERS

Suitable solvents are, for example, methyl-dimethyl carbamate, n-propyldimethyl carbamate, isopropyl dimethyl carbamate, n-butyldimethyl carbamate, isobutyl dimethyl carbamate, allyldimethyl carbamate, 2-ethylhexyldimethyl carbamate, isooctyl dimethyl carbamate, decyldimethyl carbamate, dodecyldimethyl carbamate, tridecyldimethyl carbamate, stearyldimethyl carbamate, ethyldiethyl carbamate, ethyldicyclohexyl carbamate, ethyl-N-methyl-N-phenyl carbamate, N-carbethoxymorpholine, N-carbethoxypiperidine, ethylene-bis-(N:N-dimethyl carbamate), propylene-bis-(N:N-dimethyl carbamate), hexamethylene-bis-(N:N-dimethyl carbamate), 3-oxa-pentamethylene-bis-(N:N-dimethyl carbamate), phenyldimethylcarbamate, p-chlorophenyldimethyl carbamate, o, m- or p-methylphenyldimethyl carbamates, benzyldimethyl carbamate, cyclohexyl dimethyl carbamate, N:N-bis-carbethoxypiperazine, N-carbethoxytetrahydroquinoline.

If desired, these preferred solvents can be used in admixture with other non-oxygenated phosgenation solvents, such as benzene, toluene, xylene, chlorobenzene and dichlorobenzene.

The new process can conveniently be carried out by heating a mixture of the reactants under reflux until reaction is complete, as indicated by the rate of evolution of hydrogen chloride. Thereafter the final product can be obtained by evaporating the solvent and purified, if desired, for example, by recrystallization of the residue, lixiviation with water or other means. The new process offers advantages over the previously proposed processes in being fundamentally cheaper and offering simpler isolation techniques.

The invention is illustrated but not limited by the following examples in which parts are by weight:

Example 1

To a stirred suspension of 170 parts of isopropylcarbamate in 270 parts of butylacetate, maintained at 0° C.

by external cooling there are added 90 parts of phosgene. The slurry is then heated slowly to 60° C. during about 1½ hours and the temperature is maintained at 60° for four hours. During this period the phosgene is allowed to reflux. The solution is then degassed by passing dry nitrogen through the mixture at 78° C.

Carbon is added to the hot solution, which is then filtered and the filtrates are distilled under reduced pressure to dryness. The solid residue is slurried in 400 parts of water at 30° C., filtered off and dried at 40°–50° C. The yield of carbonylbis(isopropylurethane) is 69% of theory.

Example 2

To a stirred suspension of 51.5 parts of isopropyl carbamate in 90 parts of ethyl-N,N-dimethylcarbamate, maintained at 0° C. by external cooling, there are added 37 parts of phosgene. The slurry is then heated slowly to 50° C. during about 1½ hours. During this period the phosgene is allowed to reflux. The solution is then degassed at 75° C. by passage of dry nitrogen through the mixture.

The solution is cooled to 20° C., screened from a trace of insoluble material and the filtrates are distilled under reduced pressure to dryness. The solid residue is recrystallised from 70 parts of 80–100° C. petroleum ether. The yield of carbonylbis(isopropylurethane) is 69% of theory.

Example 3

To a stirred suspension of 51.5 parts of n-propyl carbamate in 125 parts of dioxan, maintained at 0° C. by external cooling are added 30 parts of phosgene. The suspension is then heated to 60° C. during about 1½ hours and this temperature is maintained for a further 3 hours. During this period the phosgene is allowed to reflux. The solution is then degassed at 70° C. for 3 hours and 90° C. for 1 hour by passage of dry nitrogen through the mixture.

The solution is distilled under reduced pressure to dryness. The solid residue is recrystallised from 70 parts of 80–100° C. petroleum ether. The yield of carbonylbis(n-propylurethane) is 85% of theory.

Example 4

A suspension of 58.5 parts of sec-butyl carbamate in 150 parts of diethyl carbonate is cooled to 0° C. by external cooling and kept at this temperature whilst 35 parts of phosgene are added. The suspension is then heated to 60° C. during about 1½ hours and this temperature is maintained for a further 4 hours. During this period the phosgene is allowed to reflux. The solution is then degassed at 70° C. by passage of dry nitrogen through the mixture.

The solution is distilled under reduced pressure to dryness. The solid residue is recrystallised from 70 parts of 80–100° C. petroleum ether. The yield of carbonylbis-(sec-butyl urethane) is 85% of theory.

Example 5

To a stirred solution of 114 parts of isoamyl carbamate in 350 parts of butyl acetate, maintained at 0° C. by external cooling there are added 110 parts of phosgene. The solution is then stirred for 2 hours at 10° C., heated to 60° C. during 1 hour and maintained at this temperature for a further 15 hours. During this period phosgene is passed into the reaction mixture at the rate of 15 parts per hour. The solution is then degassed at 65° C. by passage of dry air through the mixture.

The solution is cooled to 50° C. and the solvent is distilled off under reduced pressure. The oily residue is recrystallised from 40–60 C. petroleum ether. The yield of carbonylbis(isoamylurethane) is 65% of theory.

Example 6

To a stirred suspension of 150 parts of methyl carbamate in 250 parts of dioxan, maintained at 0° C. by external cooling there are added 110 parts of phosgene. The mixture is then heated slowly to 40 C. and this temperature is maintained for a further 10 hours. During this period phosgene is introduced into the reaction mixture at the rate of 20 parts per hour. The solution is then degassed at 40° C. by passage of dry air through the mixture.

Carbon is added to the warm solution and the mixture is then filtered and the filtrates are distilled under reduced pressure to dryness. The solid residue is recrystallised from hot acetone. The yield of carbonyl bis(methylurethane) is 55% of theory.

Example 7

If in Example 6 the 150 parts of methyl carbamate are replaced by 68.5 parts of phenyl carbamate and the 110 parts of phosgene by 35 parts of phosgene, then carbonyl bis(phenylurethane) is obtained. The yield is approximately 50% of theory.

Example 8

A suspension of 175 parts of isobutyl carbamate in 400 parts of methyl isobutyrate is cooled to 5° C. by external cooling and kept at this temperature whilst 75 parts of phosgene are added. The suspension is then heated to 70° C. during 1½ hours and this temperature is maintained for a further 9 hours. During this period phosgene is passed into the reaction mixture at the rate of 20 parts per hour. The solution is then degassed by the passage of dry air through the mixture.

The solution is distilled under reduced pressure to dryness and the solid residue is recrystallised from 300 parts of 80–100° C. petroleum ether. The yield of carbonyl bis (isobutylurethane) is 80% of theory.

The following table lists further examples of the invention.

| Ex. No. | Carbamate | Solvent | Time (hrs.) | Temp. (° C.) | Yield of carbonyl bisurethane, percent |
|---|---|---|---|---|---|
| 9 | Ethyl | n-Propyl-carbonate | 10 | 50 | 55 |
| 10 | Isopropyl | Methylbenzoate | 10 | 70 | 70 |
| 11 | Sec. butyl | Cyclohexyl acetate | 10 | 70 | 82 |
| 12 | 50/50 mixture isopropyl/sec. butyl | Ethyleneglycol diacetate | 9½ | 65 | 65 |
| 13 | Hexyl | Ethyl succinate | 10 | 70 | 68 |
| 14 | Cyclohexyl | Ethyl-N-methyl-N-phenyl-carbamate | 9½ | 70 | 75 |
| 15 | Isopropyl | Ethyl-N:N-dimethylthiol-carbamate | 5 | 65 | 65 |
| 16 | do | Butyl acetate | 10 | 70 | 92.5 |
| 17 | 50/50 mixture isopropyl/sec. butyl carbamates | do | 10 | 70 | 95 |
| 18 | Isopropyl carbamate | Phenetole | 10 | 70 | 40 |
| 19 | do | Sulpholane | 10 | 70 | 36 |
| 20 | do | 50/50 butyl acetate/toluene | 10 | 70 | 90 |

What we claim is:

1. A process for the manufacture of carbonyl bisurethanes which comprises reacting by contacting at a temperature up to reflux a N-unsubstituted carbamic ester with phosgene in the absence of acid-binding agents, and in an organic liquid comprising at least 50% by weight of a polar organic liquid inert to phosgene, containing at least one oxygen atom in the molecule and selected from the group consisting of carboxylic acid esters, ethers, N,N-disubstituted carbamic esters and sulpholane as solvent.

2. A process as claimed in claim 1 wherein the organic liquid contains non-oxygenated solvents which are inert to phosgene in an amount up to 50% by weight.

3. A process as claimed in claim 2 wherein said other nonoxygenated solvents are selected from the group consisting of benzene, toluene, xylene, chlorobenzene and dichlorobenzene.

References Cited

UNITED STATES PATENTS

| 2,394,592 | 2/1946 | Chenicek | 260—482 |
| 2,401,080 | 5/1946 | Kilgore et al. | 260—482 |
| 2,850,529 | 9/1958 | Pinson | 260—482 |

OTHER REFERENCES

Beilstein: Mainwork band 3, pp. 63 citing Schmidt.

JAMES A. PATTEN, Primary Examiner

U.S. Cl. X.R.

260—482